US010552222B2

(12) United States Patent
Wang et al.

(10) Patent No.: US 10,552,222 B2
(45) Date of Patent: Feb. 4, 2020

(54) TASK SCHEDULING METHOD AND APPARATUS ON HETEROGENEOUS MULTI-CORE RECONFIGURABLE COMPUTING PLATFORM

(71) Applicants:Huawei Technologies Co., Ltd., Shenzhen (CN); University of Science and Technology of China, Hefei (CN)

(72) Inventors: Chao Wang, Hefei (CN); Xi Li, Hefei (CN); Xuehai Zhou, Hefei (CN); Junneng Zhang, Hefei (CN); Peng Chen, Hefei (CN); Qi Guo, Hefei (CN)

(73) Assignees: Huawei Technologies Co., Ltd., Shenzhen (CN); University of Science and Technology of China, Hefei (CN)

( * ) Notice: Subject to any disclaimer, the term of this patent is extended or adjusted under 35 U.S.C. 154(b) by 223 days.

(21) Appl. No.: 15/650,608

(22) Filed: Jul. 14, 2017

(65) Prior Publication Data
US 2017/0315846 A1 Nov. 2, 2017

Related U.S. Application Data

(63) Continuation of application No. PCT/CN2015/088955, filed on Sep. 6, 2015.

(30) Foreign Application Priority Data

Jan. 16, 2015 (CN) .......................... 2015 1 0023646

(51) Int. Cl.
*G06F 9/46* (2006.01)
*G06F 9/50* (2006.01)
*G06F 15/177* (2006.01)

(52) U.S. Cl.
CPC .......... *G06F 9/5038* (2013.01); *G06F 15/177* (2013.01)

(58) Field of Classification Search
None
See application file for complete search history.

(56) References Cited

U.S. PATENT DOCUMENTS

| | | | | |
|---|---|---|---|---|
| 2003/0154357 A1* | 8/2003 | Master | ................ | G06F 15/7867 712/15 |
| 2005/0044344 A1* | 2/2005 | Stevens | ............... | G06F 15/7867 712/227 |

(Continued)

FOREIGN PATENT DOCUMENTS

| | | |
|---|---|---|
| CN | 101630305 A | 1/2010 |
| CN | 101710292 A | 5/2010 |

(Continued)

OTHER PUBLICATIONS

"Queueing theory," https://en.wikipedia.org/w/index.php?title=Queueing_theory&oldid=642157017, pp. 1-8, XP055430568, Wikipedia (Edited Jan. 12, 2015).

*Primary Examiner* — Kenneth Tang
(74) *Attorney, Agent, or Firm* — Leydig, Voit & Mayer, Ltd.

(57) ABSTRACT

Embodiments of the present invention provide a task scheduling method and apparatus on a heterogeneous multi-core reconfigurable computing platform. The method includes: when determining that a to-be-executed hardware task is in a ready state, adding the to-be-executed hardware task into a target hardware task queue corresponding to a function of the to-be-executed hardware task; reconfiguring, according to a priority of the to-be-executed hardware task and a usage status of multiple reconfigurable resource packages, at least one reconfigurable resource package in the multiple reconfigurable resource packages into a target intellectual property IP core that can execute the to-be-executed hardware task. According to the embodiments of the present invention, a more proper resource reconfiguration occasion can be (Continued)

determined, and a more appropriate reconfigurable resource package can be used for resource reconfiguration, thereby reducing reconfiguration overheads and improving utilization of reconfigurable resources in a task scheduling process.

15 Claims, 9 Drawing Sheets

(56) References Cited

U.S. PATENT DOCUMENTS

| | | |
|---|---|---|
| 2008/0098211 A1 | 4/2008 | Maeda |
| 2011/0055480 A1* | 3/2011 | Guyetant ............. G06F 9/4881 711/118 |
| 2014/0317378 A1 | 10/2014 | Lippett |

FOREIGN PATENT DOCUMENTS

| | | |
|---|---|---|
| CN | 102253920 A | 11/2011 |
| CN | 102360309 A | 2/2012 |
| CN | 102508816 A | 6/2012 |
| CN | 102629218 A | 8/2012 |
| CN | 102681901 A | 9/2012 |
| CN | 104615488 A | 5/2015 |

* cited by examiner

100

| When determining that a to-be-executed hardware task is in a ready state, add the to-be-executed hardware task into a target hardware task queue corresponding to a function of the to-be-executed hardware task | S110 |

| According to a priority of the to-be-executed hardware task and a usage status of multiple reconfigurable resource packages, reconfigure at least one reconfigurable resource package in the multiple reconfigurable resource packages into a target intellectual property IP core that can execute the to-be-executed hardware task, where the priority denotes execution order of the hardware task | S120 |

| Execute the hardware task in the target hardware task queue by using the target IP core | S130 |

| Determine existence of idle reconfigurable resource packages according to a usage status of multiple reconfigurable resource packages if a priority of a to-be-executed hardware task is a target priority, where the idle reconfigurable resource packages are used to lay out a target IP core, a hardware task corresponding to the target priority belongs to a first hardware task set, and a priority of each hardware task in the first hardware task set is higher than a priority of each hardware task in a second hardware task set | S121 |

| Reconfigure at least one idle reconfigurable resource package in the idle reconfigurable resource packages into the target IP core that can execute the to-be-executed hardware task | S122 |

FIG. 2

TASK SCHEDULING METHOD AND APPARATUS ON HETEROGENEOUS MULTI-CORE RECONFIGURABLE COMPUTING PLATFORM

CROSS-REFERENCE TO RELATED APPLICATIONS

This application is a continuation of International Application No. PCT/CN2015/088955, filed on Sep. 6, 2015, which claims priority to Chinese Patent Application No. 201510023646.6, filed on Jan. 16, 2015. The disclosures of the aforementioned applications are hereby incorporated by reference in their entireties.

STATEMENT OF JOINT RESEARCH AGREEMENT

The subject matter and the claimed invention were made by or on the behalf of University of Science and Technology of China, of Baohe, Hefei, Anhui, P.R. China and Huawei Technologies Co., Ltd., of Shenzhen, Guangdong Province, P.R. China, under a joint research agreement titled "Task Scheduling Method and Apparatus on Heterogeneous Multi-core Reconfigurable Computing Platform". The joint research agreement was in effect on or before the claimed invention was made, and that the claimed invention was made as a result of activities undertaken within the scope of the joint research agreement.

TECHNICAL FIELD

Embodiments of the present invention relate to the computer field, and more specifically, to a task scheduling method and apparatus on a heterogeneous multi-core reconfigurable computing platform.

BACKGROUND

A computing task now has two representation forms. On a general purpose processor, a task is generally presented in a form of software code, and is referred to as a software task. The software task has advantages of being highly flexible and easy to modify and debug, but has a disadvantage of a non-ideal computing speed. On an application-specific integrated circuit, a task is generally presented in a form of a dedicated hardware circuit, and is referred to as a hardware task. The hardware task has an advantage of a high speed, but has disadvantages of being not flexible and not easy to debug. The heterogeneous multi-core reconfigurable computing platform is an effective approach to a trade-off between the conventional general purpose processor and the application-specific integrated circuit. The heterogeneous multi-core reconfigurable computing platform can not only use a reconfigurable logic device to obtain a very high speedup ratio, but can also use a reconfigurable technology or add a general purpose processor core to implement high flexibility. The heterogeneous multi-core reconfigurable computing platform eliminates drawbacks of the application-specific integrated circuit, such as high costs and lack of reusability that are caused by a complex earlier-stage designing and manufacturing process.

The heterogeneous multi-core reconfigurable computing platform may be classified into a static reconfigurable platform and a dynamic reconfigurable platform according to a reconfigurable characteristic of the computing platform. Static reconfiguration refers to static re-loading of a logic function of a target system, that is, online programming is performed in various manners while the system is idle. Dynamic reconfiguration refers to dynamically configuring a logic function of a reconfigurable logic device in real time while the system runs in real time, which can reconfigure a to-be-modified internal logic unit without affecting normal work of an unmodified logic unit. Compared with static reconfiguration, dynamic reconfiguration shortens reconfiguration time, reduces overheads for reconfiguring a system, and improves system running efficiency. Therefore, an inevitable trend is for a future heterogeneous multi-core platform to support dynamic reconfiguration.

Hardware tasks on the heterogeneous multi-core reconfigurable platform are generally executed concurrently. At a moment when a system runs, multiple running hardware tasks and multiple hardware tasks in a ready state exist in the system. In task scheduling, not only an execution time and scheduling overheads of the hardware task itself need to be considered, but also reconfiguration overheads need to be considered. At a moment when the system cannot implement a function requested by the hardware task (for example, the function may be to perform a logic operation or video processing), reconfiguration needs to be performed, and an idle reconfigurable logic resource in the system is reconfigured into the function requested by the hardware task. The reconfiguration overheads are generally not ignorable. In hardware task scheduling, it is required to maximally reduce times of reconfiguration while ensuring overall performance of the system, so as to achieve a purpose of reducing reconfiguration overheads.

SUMMARY

In view of this, embodiments of the present invention provide a task scheduling method and apparatus on a heterogeneous multi-core reconfigurable computing platform, which can reduce reconfiguration overheads and improve utilization of reconfigurable resources in a task scheduling process.

According to a first aspect, a task scheduling method on a heterogeneous multi-core reconfigurable computing platform is provided, where the heterogeneous multi-core reconfigurable computing platform includes multiple reconfigurable resource packages, and the method includes: when determining that a to-be-executed hardware task is in a ready state, adding the to-be-executed hardware task into a target hardware task queue corresponding to a function of the to-be-executed hardware task; reconfiguring, according to a priority of the to-be-executed hardware task and a usage status of the multiple reconfigurable resource packages, at least one reconfigurable resource package in the multiple reconfigurable resource packages into a target Intellectual Property (IP) core that can execute the to-be-executed hardware task, where the priority denotes an execution order of the hardware task; and executing the hardware task in the target hardware task queue by using the target IP core.

With reference to the first aspect, in a first possible implementation manner of the first aspect, the reconfiguring, according to a priority of the to-be-executed hardware task and a usage status of the multiple reconfigurable resource packages, at least one reconfigurable resource package in the multiple reconfigurable resource packages into a target intellectual property IP core that can execute the to-be-executed hardware task includes: determining existence of idle reconfigurable resource packages according to the usage status of the multiple reconfigurable resource packages when the priority of the to-be-executed hardware task is a target priority, where the idle reconfigurable resource packages are used to lay out the target IP core, a hardware task corresponding to the target priority belongs to a first hardware task set, and a priority of each hardware task in the first hardware task set is higher than a priority of each hardware task in a second hardware task set; and reconfiguring at least one idle reconfigurable resource package in the idle reconfigurable resource packages into the target IP core that can execute the to-be-executed hardware task.

With reference to the first aspect or the first possible implementation manner of the first aspect, in a second possible implementation manner of the first aspect, the method further includes: determining the priority of the to-be-executed hardware task according to a length of the target hardware task queue and a quantity of IP cores that can execute the to-be-executed hardware task.

With reference to the first or the second possible implementation manner of the first aspect, in a third possible implementation manner of the first aspect, the reconfiguring at least one idle reconfigurable resource package in the idle reconfigurable resource packages into the target IP core that can execute the to-be-executed hardware task includes: determining a target reconfigurable resource package, where the target reconfigurable resource package is any reconfigurable resource package in the idle reconfigurable resource packages; and reconfiguring the target reconfigurable resource package into the target IP core.

With reference to the third possible implementation manner of the first aspect, in a fourth possible implementation manner of the first aspect, the method further includes: re-determining the priority of the to-be-executed hardware task if a quantity of times for which the to-be-executed hardware task changes from the ready state into a short sleep state reaches a preset threshold; and accordingly, the reconfiguring the target reconfigurable resource package into the target IP core includes: reconfiguring the target reconfigurable resource package into the target IP core when the re-determined priority of the to-be-executed hardware task is the target priority.

With reference to the third or the fourth possible implementation manner of the first aspect, in a fifth possible implementation manner of the first aspect, the reconfiguring the target reconfigurable resource package into the target IP core includes: reconfiguring the target reconfigurable resource package into the target IP core according to a target configuration file in a configuration file set, where the target configuration file carries a correspondence between the target reconfigurable resource package in the multiple reconfigurable resource packages and the target IP core.

With reference to any one of the first aspect or the first to the fifth possible implementation manners of the first aspect, in a sixth possible implementation manner of the first aspect, the executing the hardware task in the target hardware task queue by using the target IP core includes: executing the hardware task in the target hardware task queue according to a first-come first-served policy by using the target IP core.

According to a second aspect, a task scheduling apparatus on a heterogeneous multi-core reconfigurable computing platform is provided, where the heterogeneous multi-core reconfigurable computing platform includes multiple reconfigurable resource packages, and the apparatus includes: a task scheduling module, configured to: when determining that a to-be-executed hardware task is in a ready state, add the to-be-executed hardware task into a target hardware task queue corresponding to a function of the to-be-executed hardware task; a resource management module, configured to reconfigure, according to a priority of the to-be-executed hardware task and a usage status of the multiple reconfigurable resource packages, at least one reconfigurable resource package in the multiple reconfigurable resource packages into a target intellectual property IP core that can execute the to-be-executed hardware task, where the priority denotes an execution order of the hardware task; and a task execution module, configured to execute the hardware task in the target hardware task queue by using the target IP core that is reconfigured by the resource management module.

With reference to the second aspect, in a first possible implementation manner of the second aspect, in terms of the reconfiguring, according to a priority of the to-be-executed hardware task and a usage status of the multiple reconfigurable resource packages, at least one reconfigurable resource package in the multiple reconfigurable resource packages into a target intellectual property IP core that can execute the to-be-executed hardware task, the resource management module is specifically configured to: determine existence of idle reconfigurable resource packages according to the usage status of the multiple reconfigurable resource packages when the priority of the to-be-executed hardware task is a target priority, where the idle reconfigurable resource packages are used to lay out the target IP core, a hardware task corresponding to the target priority belongs to a first hardware task set, and a priority of each hardware task in the first hardware task set is higher than a priority of each hardware task in a second hardware task set; and reconfigure at least one idle reconfigurable resource package in the idle reconfigurable resource packages into the target IP core that can execute the to-be-executed hardware task.

With reference to the second aspect or the first possible implementation manner of the second aspect, in the second possible implementation manner of the second aspect, the resource management module is further configured to: determine the priority of the to-be-executed hardware task according to a length of the target hardware task queue and a quantity of IP cores that can execute the to-be-executed hardware task.

With reference to the first or the second possible implementation manner of the second aspect, in a third possible implementation manner of the second aspect, in terms of the reconfiguring at least one idle reconfigurable resource package in the idle reconfigurable resource packages into the target IP core that can execute the to-be-executed hardware task, the resource management module is specifically configured to: determine a target reconfigurable resource package, where the target reconfigurable resource package is any reconfigurable resource package in the idle reconfigurable resource packages; and reconfigure the target reconfigurable resource package into the target IP core.

With reference to the third possible implementation manner of the second aspect, in a fourth possible implementation manner of the second aspect, the resource management module is further configured to: re-determine the priority of the to-be-executed hardware task if a quantity of times for which the to-be-executed hardware task changes from the ready state into a short sleep state reaches a preset threshold; and accordingly, in terms of the reconfiguring the target reconfigurable resource package into the target IP core, the resource management module is specifically configured to: reconfigure the target reconfigurable resource package into the target IP core when the re-determined priority of the to-be-executed hardware task is the target priority.

With reference to the third or the fourth possible implementation manner of the second aspect, in a fifth possible implementation manner of the second aspect, in terms of the reconfiguring the target reconfigurable resource package into the target IP core, the resource management module is specifically configured to: reconfigure the target reconfigurable resource package into the target IP core according to a target configuration file in a configuration file set, where the target configuration file carries a correspondence between the target reconfigurable resource package in the multiple reconfigurable resource packages and the target IP core.

With reference to any one of the second aspect or the first to the fifth possible implementation manners of the second aspect, in a sixth possible implementation manner of the second aspect, in terms of the executing the hardware task in the target hardware task queue by using the target IP core, the task execution module is specifically configured to: execute the hardware task in the target hardware task queue according to a first-come first-served policy by using the target IP core that is reconfigured by the resource management module.

Compared with the prior art, the embodiments of the present invention have the following beneficial effects: In the task scheduling method and apparatus on a heterogeneous multi-core reconfigurable computing platform according to the embodiments of the present invention, when determining that a to-be-executed hardware task is in a ready state, the computing platform adds the to-be-executed hardware task into a target hardware task queue corresponding to a function of the to-be-executed hardware task; reconfigures, according to a priority of the to-be-executed hardware task and a usage status of the multiple reconfigurable resource packages included in the heterogeneous multi-core reconfigurable computing platform, at least one reconfigurable resource package in the multiple reconfigurable resource packages into a target IP core that can execute the to-be-executed hardware task; and executes the hardware task in the target hardware task queue by using the target IP core. According to the priority of the to-be-executed task and the usage status of the reconfigurable resource packages, the computing platform can determine a more proper resource reconfiguration occasion, and use a more appropriate reconfigurable resource package for resource reconfiguration, thereby reducing reconfiguration overheads and improving utilization of reconfigurable resources in a task scheduling process.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

FIG. 1 is a schematic flowchart of a task scheduling method on a heterogeneous multi-core reconfigurable computing platform according to an embodiment of the present invention;

FIG. 2 is a schematic flowchart of reconfiguring, according to a priority of a to-be-executed hardware task and a usage status of multiple reconfigurable resource packages, at least one reconfigurable resource package in the multiple reconfigurable resource packages into a target intellectual property IP core that can execute the to-be-executed hardware task according to an embodiment of the present invention;

DESCRIPTION OF EMBODIMENTS

Figure 3:
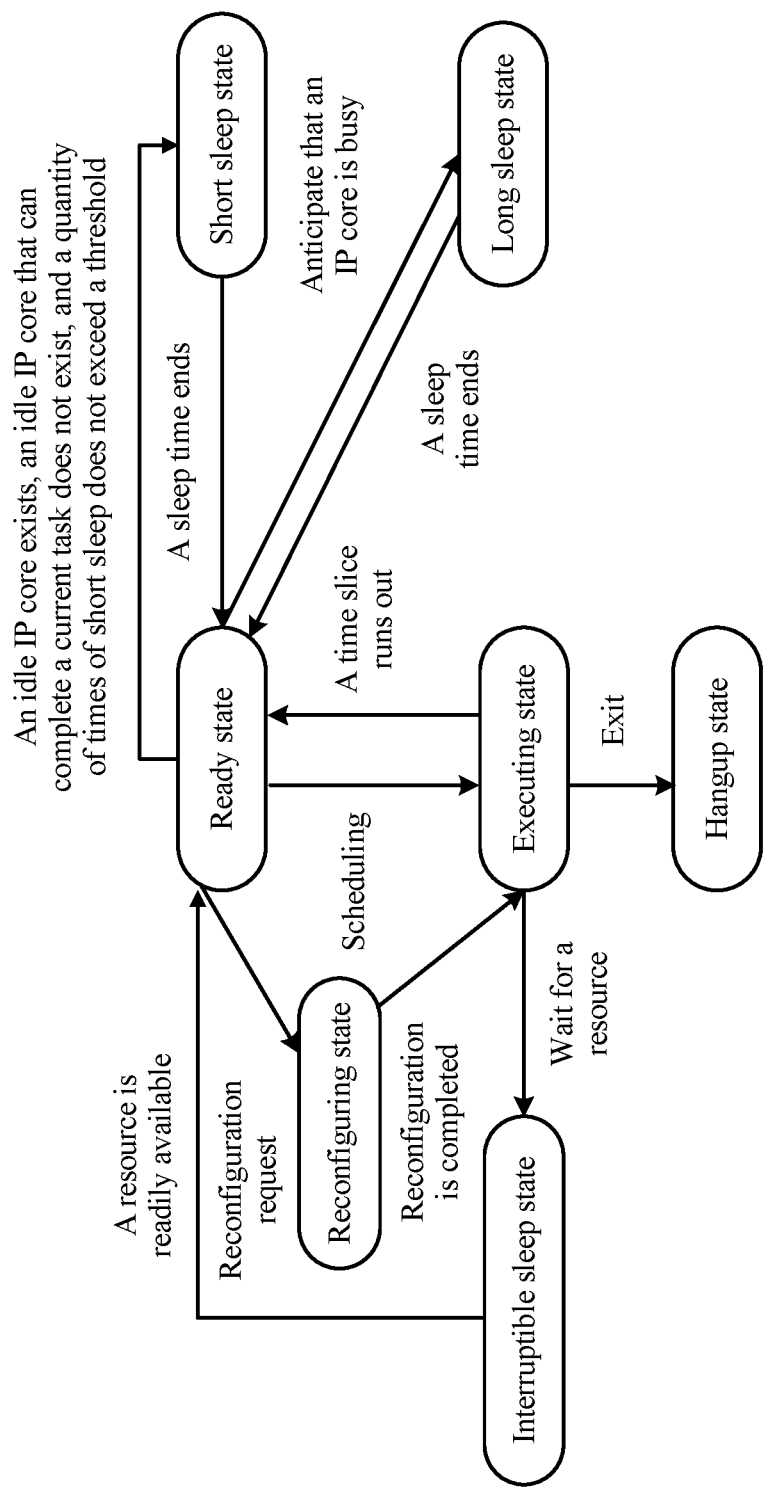
FIG. 3 is a schematic diagram of state transition of a hardware task on a heterogeneous multi-core reconfigurable computing platform according to an embodiment of the present invention.

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

It should be understood that a heterogeneous multi-core reconfigurable computing platform in the embodiments of the present invention refers to a computing system with both a general purpose processor ("GPP" for short) and a field programmable gate array ("FPGA" for short) integrated on a single physical chip. Specifically, the multi-core characteristic is specifically reflected by a quantity of computing modules integrated on a single chip, including but not limited to multiple general purpose processors, multiple IP cores, and multiple dedicated processors. If there is more than one computing module, the computing platform is multi-core. On this basis, the heterogeneous characteristic is specifically reflected by a type of integrated computing modules. For example, if there is more than one type of computing modules, the computing platform is heterogeneous. The reconfigurable characteristic is reflected by a dynamically variable state of a function unit. For example, if a computing unit is replaceable, the computing platform is reconfigurable. Therefore, the heterogeneous multi-core reconfigurable computing platform refers to a computer system that includes modules such as a computing module, a storage module, an interconnect module, and related peripherals, but the present invention is not limited thereto.

It should also be understood that the intellectual property (Intellectual Property, or "IP" for short) core is a logic circuit that implements a specific function in a chip, and is generally belongs to a hardware scope. In the present invention, specific implementation of the IP core is a hardware module that is built of basic gate circuits on an FPGA.

FIG. 1 shows a schematic flowchart of a task scheduling method 100 on a heterogeneous multi-core reconfigurable computing platform according to an embodiment of the present invention. The heterogeneous multi-core reconfigurable computing platform includes multiple reconfigurable resource packages. The method 100 may be executed by a computing platform (for example, the computing platform may be a computer). As shown in FIG. 1, the method 100 includes the following steps:

S110. When determining that a to-be-executed hardware task is in a ready state, add the to-be-executed hardware task into a target hardware task queue corresponding to a function of the to-be-executed hardware task.

S120. According to a priority of the to-be-executed hardware task and a usage status of the multiple reconfigurable resource packages, reconfigure at least one reconfigurable resource package in the multiple reconfigurable resource packages into a target intellectual property IP core that can execute the to-be-executed hardware task, where the priority denotes an execution order of the hardware task.

S130. Execute the hardware task in the target hardware task queue by using the target IP core.

Specifically, when determining that the to-be-executed hardware task is in the ready state, the computing platform adds the to-be-executed hardware task into the target hardware task queue corresponding to the function of the to-be-executed hardware task; reconfigures, according to the priority of the to-be-executed hardware task and the usage status of the multiple reconfigurable resource packages, at least one reconfigurable resource package in the multiple reconfigurable resource packages into the target IP core that can execute the to-be-executed hardware task; and after completing reconfiguration, executes the hardware task in the target hardware task queue by using the target IP core.

Therefore, in the task scheduling method in this embodiment of the present invention, when determining that a to-be-executed hardware task is in a ready state, a computing platform adds the to-be-executed hardware task into a target hardware task queue corresponding to a function of the to-be-executed hardware task; reconfigures, according to a priority of the to-be-executed hardware task and a usage status of the multiple reconfigurable resource packages, at least one reconfigurable resource package in the multiple reconfigurable resource packages into a target IP core that can execute the to-be-executed hardware task; and executes the hardware task in the target hardware task queue by using the target IP core. According to the priority of the to-be-executed hardware task and the usage status of the reconfigurable resource package, the computing platform decides a task scheduling process, and can determine a more proper resource reconfiguration occasion and use a more appropriate reconfigurable resource package for resource reconfiguration, thereby reducing reconfiguration overheads and improving utilization of reconfigurable resources in the task scheduling process.

It should be understood that in this embodiment of the present invention, a reconfigurable resource (Field Programmable Gate Array, "FPGA" for short) on the heterogeneous multi-core reconfigurable computing platform may be divided into multiple reconfigurable resource packages with equal or unequal areas. A layout of the reconfigurable resource package is fixed whenever the system is started, and cannot be changed. After the system is started, the IP core that can be laid out on each reconfigurable resource package is dynamically variable. That is, a function that can be implemented by each reconfigurable resource package is dynamically variable.

It should be understood that a function of the hardware task in this embodiment of the present invention refers to a function requested by the hardware task or a function that can be implemented by executing the hardware task. For example, the function may be a logical operation, a matrix operation, video processing, or the like. A hardware platform may use a flag bit to provide a user program with an interface for transmitting the hardware function, so as to determine the function of the hardware task.

It should also be understood that in this embodiment of the present invention, a specific implementation process of executing the hardware task in the target hardware task queue by using the target IP core is that the heterogeneous platform controls the target IP core, and drives the hardware circuit by providing a hardware task input for the target IP core, so as to achieve a purpose of executing the hardware task and generate an output.

In this embodiment of the present invention, optionally, if the to-be-executed task is a software task, the to-be-executed task is executed by using the CPU.

Optionally, in S110, if the to-be-executed hardware task is not ready, the computing platform waits for the to-be-executed hardware task to get ready. In this case, the state of the to-be-executed hardware task changes from a non-ready state to the ready state, where the ready state refers to a state in which all input data of the task is ready.

Optionally, in S110, the target hardware task queue is a buffer (a special data structure) and is used to store a to-be-executed hardware task. The to-be-executed hardware task may be inserted into any location in the target hardware task queue. Preferably, the to-be-executed hardware task may be inserted into the tail of the target hardware task queue, which is not limited in the present invention.

Optionally, in S120, the priority of the to-be-executed hardware task may be preset. For example, a correspondence between the function of the hardware task and the priority of the hardware task may be preset, and the computing platform can determine the priority of the task according to the function of the hardware task. The priority of the to-be-executed hardware task may also be determined by the computing platform in real time. For example, the priority of the to-be-executed hardware task may be determined according to a length of the target hardware task queue in which the to-be-executed hardware task is located and according to a quantity of IP cores that can execute the to-be-executed hardware task, but the present invention is not limited thereto.

In this embodiment of the present invention, preferably, when an IP core that can execute a to-be-executed hardware task exists on the computing platform, the priority $P_i$ of the to-be-executed hardware task may be set to $d*T_i*\text{Length}(L_i)/K_i$; otherwise, when an IP core that can execute a to-be-executed hardware task does not exist on the computing platform, the priority $P_i$ of the to-be-executed hardware task is set to $T_i*Length(L_i)$, where $P_i$ refers to the priority of the hardware task; d refers to a precedence parameter of a laid-out hardware task over a non-laid out hardware task on the computing platform, d is a natural number greater than 1, for example, 2 or 3; $L_i$ refers to a hardware task queue that implements a specific function, and Length ($L_i$) is the length of the hardware task queue; $K_i$ refers to a quantity of the IP cores that have been laid out currently and have implemented a specific function; and a value range of i is 1 to N, and N is a total quantity of hardware task types that can be implemented by hardware on the computing platform, but the present invention is not limited thereto.

With reference to FIG. 2 to FIG. 5, the following gives a detailed description about a task scheduling method in FIG. 1 according to an embodiment of the present invention.

As shown in FIG. 2, in this embodiment of the present invention, optionally, in S120, the reconfiguring, according to a priority of the to-be-executed hardware task and a usage status of the multiple reconfigurable resource packages, at least one reconfigurable resource package in the multiple reconfigurable resource packages into a target intellectual property IP core that can execute the to-be-executed hardware task includes the following steps:

S121. Determine existence of idle reconfigurable resource packages according to the usage status of the multiple reconfigurable resource packages when the priority of the to-be-executed hardware task is a target priority, where the idle reconfigurable resource packages are used to lay out the target IP core, a hardware task corresponding to the target priority belongs to a first hardware task set, and a priority of each hardware task in the first hardware task set is higher than a priority of each hardware task in a second hardware task set.

S122. Reconfigure at least one idle reconfigurable resource package in the idle reconfigurable resource packages into the target IP core that can execute the to-be-executed hardware task.

It should be understood that in this embodiment of the present invention, the idle reconfigurable resource package that is used to lay out the target IP core may be understood in such a way that the idle reconfigurable resource package can be reconfigured into the target IP core. Because the idle reconfigurable resource packages are used to lay out the target IP core, a reconfigurable resource package that is executing a task is not interfered in the reconfiguration process, so that system concurrency can be enhanced in the task scheduling process.

In this embodiment of the present invention, optionally, all hardware tasks on the computing platform may be prioritized into multiple hardware task sets. A priority of a hardware task in a hardware task set corresponding to the target priority is at least higher than a priority of a hardware task in a task set in the multiple hardware task sets.

In this embodiment of the present invention, preferably, all the hardware tasks on the computing platform may be prioritized into the first hardware task set and the second hardware task set. A priority of any hardware task in the first hardware task set is higher than a priority of any hardware task in the second hardware task set, and the hardware task corresponding to the target priority belongs to the first hardware task set.

Preferably, in S121, the priority of the hardware task corresponding to the target priority is not lower than the priority of any hardware task in all the hardware tasks. That is, the priority of the hardware task corresponding to the target priority is the highest in all the hardware tasks.

Optionally, in S121, when the idle reconfigurable resource package that can be used to lay out the target IP core does not exist on the computing platform, the state of the to-be-executed hardware task may change from the ready state to a long sleep state. A sleep time of the hardware task in the long sleep state is a difference between minimum $F_j$ and current time. $F_j$ denotes anticipated execution ending time of each IP core on the computing platform, j denotes a number of a reconfigurable resource package, and $F_j$ is initialized to 0.

In this embodiment of the present invention, optionally, when the priority of the to-be-executed hardware task is the target priority, if the idle reconfigurable resource package exists on the computing platform but an idle reconfigurable resource package that can be used to lay out an IP core for executing the to-be-executed hardware task does not exist, the state of the to-be-executed hardware task may change from the ready state to a short sleep state. Whenever the short sleep state ends, it is determined whether the idle reconfigurable resource package that can be used to lay out the IP core for executing the to-be-executed hardware task exists on the computing platform. If idle reconfigurable resource packages that can be used to lay out the IP core for executing the to-be-executed hardware task appears on the computing platform when a quantity of times for which the to-be-executed hardware task changes from the ready state to the short sleep state is less than a system preset threshold, one of the idle reconfigurable resource packages is selected for performing resource reconfiguration. If no idle reconfigurable resource package that can be used to lay out the IP core capable of executing the to-be-executed hardware task appears on the computing platform when the quantity of times for which the to-be-executed hardware task changes to the short sleep state is greater than the system preset threshold, the state of the to-be-executed hardware task may change from the short sleep state to the ready state, and then change from the ready state to the long sleep state, but this embodiment of the present invention is not limited thereto.

In this embodiment of the present invention, optionally, as shown in FIG. 3, each hardware task has seven states, which may be denoted by a ready state, an executing state, a hangup state, a reconfiguring state, an interruptible sleep state, a short sleep state, and a long sleep state. When a specific condition is met, the hardware task may transit between the different states. The ready state is a state in which all input data of a task is ready and execution may start; the executing state is a state in which a task is loaded onto an IP core for running; the hangup state is a state in which a task exits after the execution ends; the reconfiguring state is a state in which the task cannot run immediately and a reconfigurable resource package needs to be reconfigured; the interruptible sleep state is a state in which a task cannot run until there is a resource; and both the short sleep state and the long sleep state refer to states in which a task waits to be waked, where a wait time may be a system preset value.

A condition on which the ready state of the task changes to the executing state is that the task participates in scheduling, and the priority of the task is the highest; a condition on which the executing state of the task changes to the ready state is that a time slice of the task runs out; a condition on which the executing state of the task changes to the hangup state is that the task exits; a condition on which the executing state of the task changes to the interruptible sleep state is that a task resource is not ready and the task is waiting for the resource; a condition on which the interruptible sleep state of the task changes to the ready state is that the resource required by the task is readily available; a condition on which the ready state of the task changes to the short sleep state is that an idle IP core exists, an idle IP core that can complete a current task does not exist, and times of short sleep do not exceed a threshold, where the threshold may be set; a condition on which the short sleep state of the task changes to the ready state is that a sleep time ends; a condition on which the ready state of the task changes to the long sleep state is that it is anticipated that all IP cores are busy; a condition on which the long sleep state of the task changes to the ready state is that a sleep time ends; a condition on which the ready state of the task changes to the reconfiguring state is that a quantity of times for which the task enters the short sleep state exceeds a threshold or that the priority of the task exceeds a priority of a task on an IP core that has been laid out and that an idle IP core that can complete a current task exists currently; and a condition on which the reconfiguring state of the task changes to the executing state is that the system completes a reconfiguration operation of the IP core.

Figure 4:
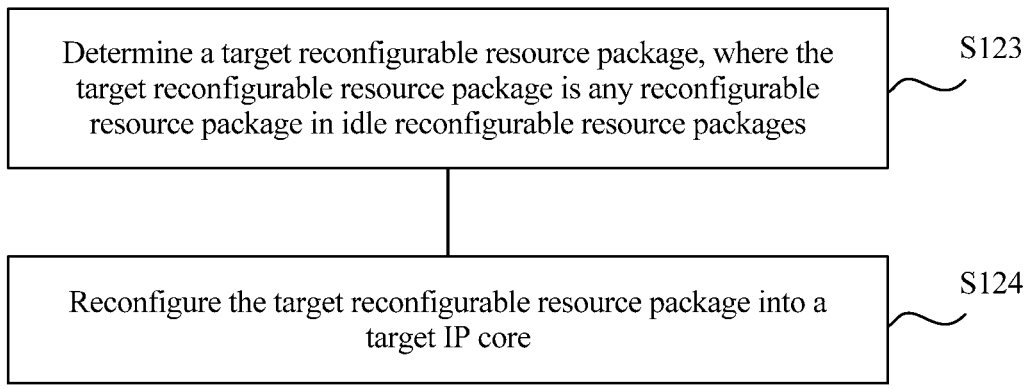
FIG. 4 is a schematic flowchart of a method for reconfiguring at least one idle reconfigurable resource package in idle reconfigurable resource packages into a target IP core that can execute a to-be-executed hardware task according to an embodiment of the present invention.

In an embodiment of the present invention, optionally, in S122, as shown in FIG. 4, the reconfiguring at least one idle reconfigurable resource package in the idle reconfigurable resource packages into the target IP core that can execute the to-be-executed hardware task includes the following steps:

S123. Determine a target reconfigurable resource package, where the target reconfigurable resource package is any reconfigurable resource package in the idle reconfigurable resource packages.

Preferably, in S123, the target reconfigurable resource package is a reconfigurable resource package that is left unused for the longest time in the idle reconfigurable resource packages.

S124. Reconfigure the target reconfigurable resource package into the target IP core.

Figure 5:
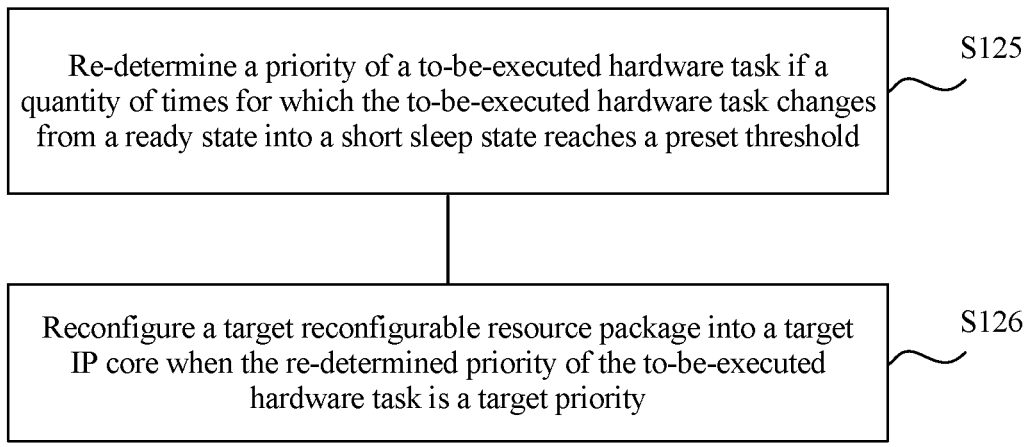
FIG. 5 is a schematic flowchart of a method for reconfiguring a target reconfigurable resource package into a target IP core according to an embodiment of the present invention.

In this embodiment of the present invention, optionally, in S124, as shown in FIG. 5, the reconfiguring the target reconfigurable resource package into the target IP core includes the following steps:

S125. Re-determine the priority of the to-be-executed hardware task if a quantity of times for which the to-be-executed hardware task changes from the ready state into a short sleep state reaches a preset threshold.

S126. Reconfigure the target reconfigurable resource package into the target IP core when the re-determined priority of the to-be-executed hardware task is the target priority.

Optionally, in S125, the preset threshold may be any value that is set according to practical experience, for example, may be 3, 4, or 5, which is not limited in the present invention.

Optionally, in S125, the sleep time of the task in the short sleep state may be any value that is set according to practical experience, for example, may be 100 ms or 200 ms, which is not limited in the present invention.

Optionally, in S126, when the priority is not the target priority, the computing platform does not execute a resource reconfiguration operation, and the to-be-executed hardware task may enter the long sleep state.

In this embodiment of the present invention, optionally, the computing platform may reconfigure the reconfigurable resource package into an IP core according to a configuration file set, where each configuration file in the configuration file set carries a correspondence between one reconfigurable resource package in the multiple reconfigurable resource packages and an IP core. The target configuration file in the configuration file set carries a correspondence between the target reconfigurable resource package in the multiple reconfigurable resource packages and the target IP core. The reconfigurable resource package may also be reconfigured into the IP core according to related parameters in the system, which is not limited in the present invention.

Figure 6:
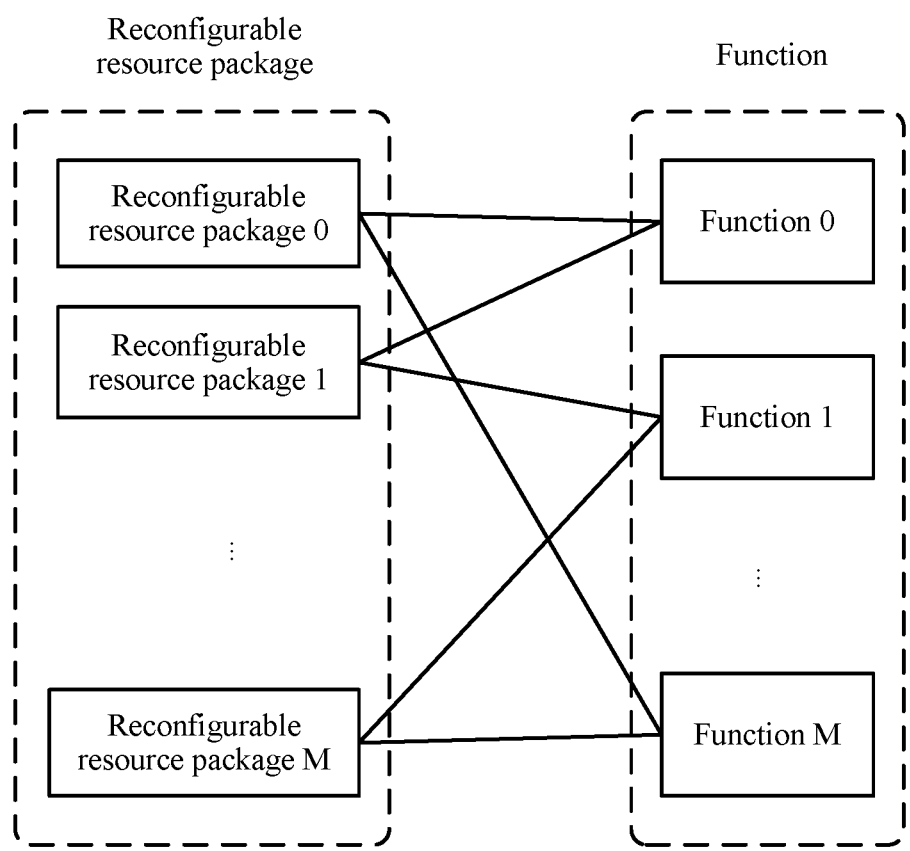
FIG. 6 is a schematic diagram of a mapping relationship between a reconfigurable resource package and a function according to an embodiment of the present invention.

In this embodiment of the present invention, optionally, as shown in FIG. 6, a many-to-many mapping relationship is met between reconfigurable resource packages and functions. One reconfigurable resource package may be laid out as an IP core of different functions, and a same function may also be laid out on different reconfigurable resource packages. For example, it is assumed that reconfigurable resources on the computing platform are divided into three reconfigurable resource packages numbered 0, 1, and 2 respectively; the computing platform can execute four functions: a function 1 (an addition operation), a function 2 (a subtraction operation), a function 3 (a matrix operation), and a function 4 (video processing). Therefore, a correspondence between the reconfigurable resource packages and the functions may be reflected by: 0 may be corresponding to the function 1 and the function 2, 1 may be corresponding to the function 1 and the function 3, and 2 may be corresponding to the function 1, the function 3, and the function 4. Specifically, a reconfigurable resource package set in the system may be set to BbSet, and each element in the set denotes a number BbNum of a reconfigurable resource package; and a function set may be set to FunSet, each element in the set denotes a number FunNum of a function, and there are multiple IP cores corresponding to each function in the system. If a mapping relationship between BbSet and FunSet is defined as f: BbSet→FunSet, the mapping relationship f may be denoted by a set of 2-tuples <BbNum, FunNum>, where the 2-tuple actually also denotes a mapping relationship between a reconfigurable resource package and an IP core. The set is defined as IPSet. IPSet decides design of an IP core library. A configuration file set in the IP core library is defined as ConfigSet, and each element in the set is a configuration file FileNum. Therefore, a one-to-one mapping relationship is met between IPSet and ConfigSet. That is, each 2-tuple <BbNum, FunNum> is corresponding to one FileNum, but the present invention is not limited thereto.

Optionally, the mapping relationship between the reconfigurable resource package and the function is established before task scheduling. For example, the mapping relationship between the reconfigurable resource package and the function is established in a process of initializing the computing platform, which is not limited in this embodiment of the present invention.

Therefore, in the task scheduling method in this embodiment of the present invention, when determining that a to-be-executed hardware task is in a ready state, the to-be-executed hardware task is added into a target hardware task queue corresponding to a function of the to-be-executed hardware task; according to a priority of the to-be-executed hardware task and a usage status of the multiple reconfigurable resource packages, at least one reconfigurable resource package in the multiple reconfigurable resource packages is reconfigured into a target IP core that can execute the to-be-executed hardware task; and the hardware task in the target hardware task queue is executed by using the target IP core. When a computing platform is initialized, a mapping relationship between a reconfigurable resource package and a function is established, thereby reducing design space exploration required when a system performs hardware task scheduling and resource management, and reducing scheduling overheads and resource management overheads. The computing platform decides a task scheduling process according to the priority of the to-be-executed hardware task and the usage status of the multiple reconfigurable resource packages, and can determine a more proper resource reconfiguration occasion and use a more appropriate reconfigurable resource package for resource reconfiguration, thereby reducing reconfiguration overheads and improving utilization of reconfigurable resources in the task scheduling process.

It should be understood that in this embodiment of the present invention, after the computing platform completes the resource reconfiguration operation, the reconfigured target IP core that can be used to execute the to-be-executed hardware task may execute all the hardware tasks in the target hardware task queue, or may migrate some tasks in the target hardware task queue and the to-be-executed hardware task onto the reconfigured IP core for execution, which is not limited in the present invention.

Optionally, in S130, the computing platform may execute the task in the target hardware task queue according to a first-come first-served policy, or may execute the task in the target hardware task queue according to the priority of the hardware task, a polling method, or another policy, which is not limited in the present invention.

Therefore, in the task scheduling method in this embodiment of the present invention, when determining that a to-be-executed hardware task is in a ready state, the to-be-executed hardware task is added into a target hardware task queue corresponding to a function of the to-be-executed hardware task; according to a priority of the to-be-executed hardware task and a usage status of the multiple reconfigurable resource packages, at least one reconfigurable resource package in the multiple reconfigurable resource packages is reconfigured into a target IP core that can execute the to-be-executed hardware task; and the hardware task in the target hardware task queue is executed by using the target IP core. According to the priority of the to-be-executed hardware task and the usage status of the multiple reconfigurable resource packages, the computing platform decides a task scheduling process, and can determine a more proper resource reconfiguration occasion and use a more appropriate reconfigurable resource package for resource reconfiguration. In addition, a reconfigurable resource package that is executing a task is not interfered in a reconfiguration process, thereby enhancing system concurrency, reducing reconfiguration overheads and improving utilization of reconfigurable resources in the task scheduling process.

Figure 7:
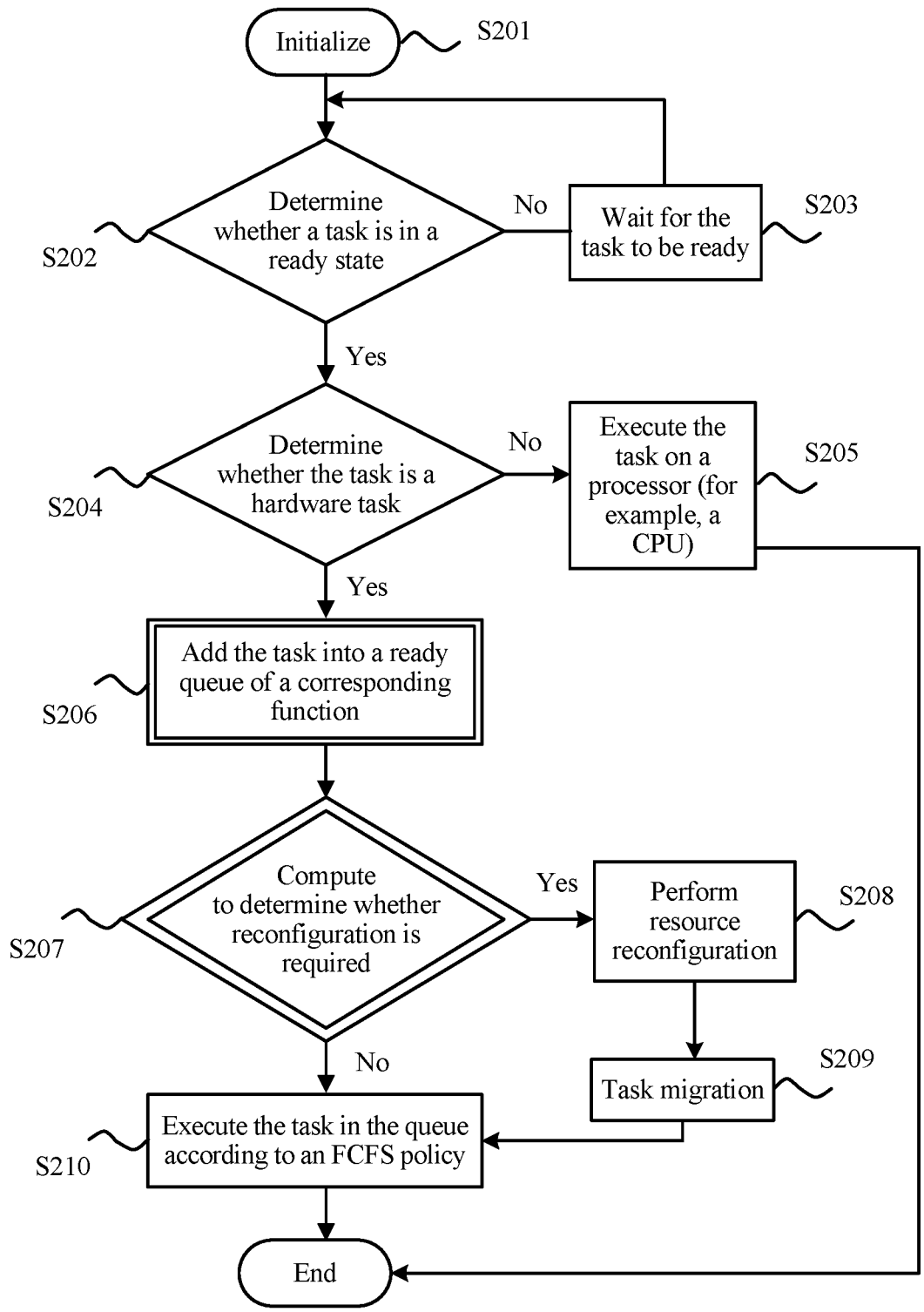
FIG. 7 is a schematic flowchart in a specific case of a method for reconfiguring a resource on a heterogeneous multi-core reconfigurable computing platform according to an embodiment of the present invention.
Figure 8:
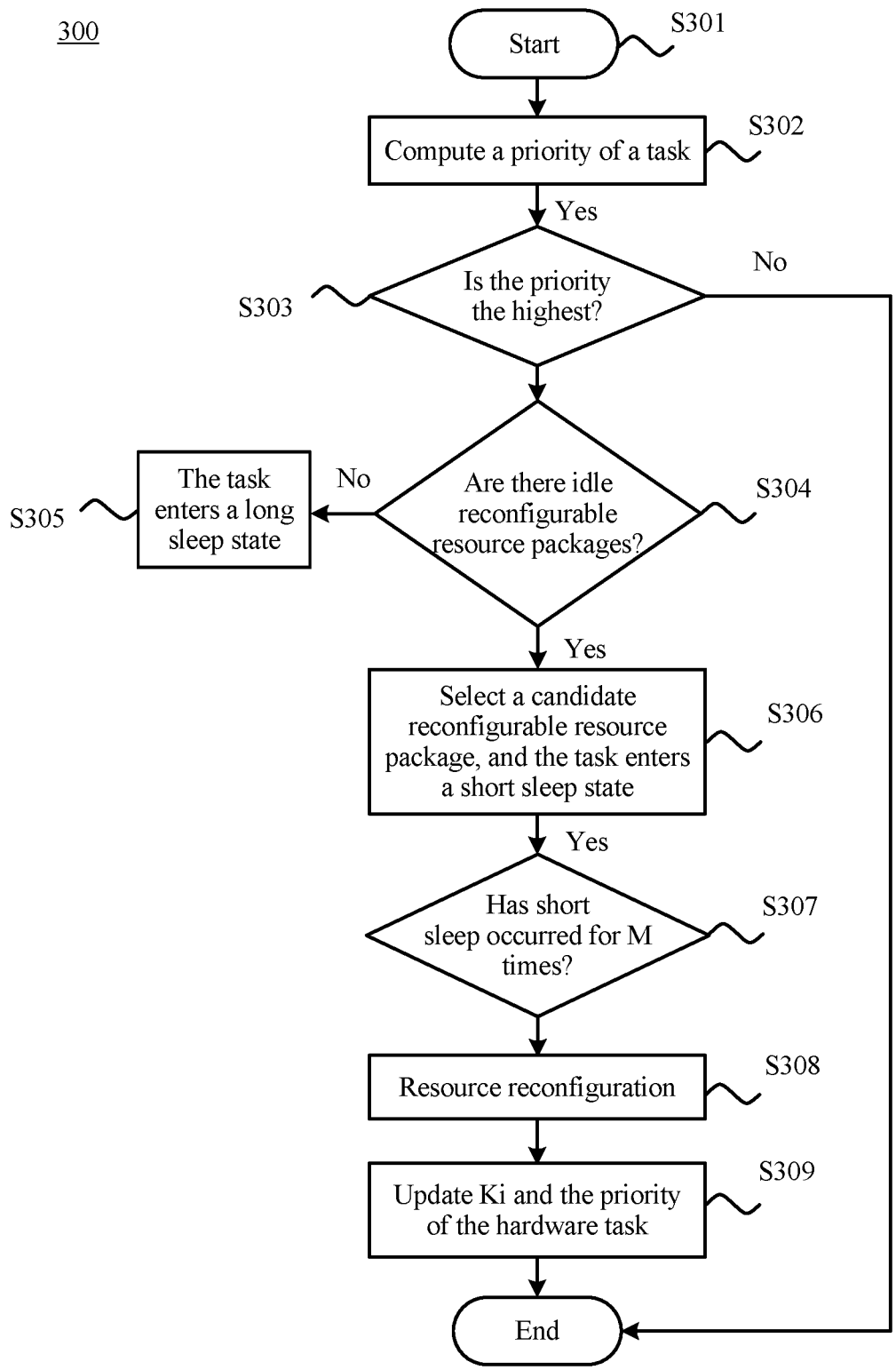
FIG. 8 is a schematic flowchart of computing on a heterogeneous multi-core reconfigurable computing platform to determine whether reconfiguration is required, and when reconfiguration is required, a process of resource reconfiguration according to an embodiment of the present invention.

The foregoing describes in detail the task scheduling method 100 according to an embodiment of the present invention with reference to FIG. 1 to FIG. 6. With reference to FIG. 7 and FIG. 8, the following describes in detail a specific process of implementing task scheduling on a heterogeneous multi-core reconfigurable computing platform according to the method described in FIG. 1 to FIG. 6.

FIG. 7 and FIG. 8 show schematic method flowcharts of a task scheduling process implemented on a heterogeneous multi-core reconfigurable computing platform in a specific case according to the method described in FIG. 1 to FIG. 6. FIG. 7 is described with reference to FIG. 8. As shown in FIG. 7, a task scheduling method 200 on a heterogeneous multi-core reconfigurable computing platform according to an embodiment of the present invention includes the following steps:

S201. Initialize a platform, and create a task.

In this embodiment of the present invention, in a platform initialization process, information in an IP core library is read first, and a reconfigurable resource package set BbSet in a system, a function set FunSet, and a mapping relationship ConfigSet between the reconfigurable resource package set BbSet and the function set FunSet are determined. The function set in this embodiment of the present invention refers to a set of functions that can be implemented by a hardware task, and does not include functions of a software task. No IP core is laid out in any reconfigurable resource package at a moment of initialization. That is, functions of the reconfigurable resource package are empty. Then other parameters in the system are initialized, including:

1. a total quantity N of types of tasks that can be implemented by hardware: N is initialized to a size of the function set FunSet;

2. a non-ready queue Lu: Lu is initialized to empty and its length is initialized to 0;

3. a ready software task queue $LR_k$, k=1, 2, ..., G: G denotes a quantity of general purpose processors, and $LR_k$ is initialized to empty and its length is initialized to 0;

4. a hardware task queue for implementing a specific function: $L_i$, i=1, 2, ..., N, and $L_i$ is initialized to an empty queue and its length is initialized to 0;

5. a quantity of IP cores that are currently laid out for implementing a specific function: $K_i$=1, 2, ..., N, and $K_i$ is initialized to 0;

6. a priority of the hardware task: $P_i$, i=1, 2, ..., N, and $P_i$ is initialized to 0;

7. a short sleep time threshold det: optionally, det is initialized to 100 ms;

8. a threshold M of a quantity of times of entering a short sleep by the task: optionally, M is initialized to 5;

9. a time required for executing each type of hardware task once: $T_i$=1, 2, ..., N, and $T_i$ is initialized to an actual execution time of each type of IP core;

10. a precedence constant d (d>1) of a laid-out hardware task over a non-laid-out hardware task: optionally, d is initialized to 2; and 11. a global information table TG: a type of IP cores laid out on each reconfigurable resource package and anticipated execution ending time $F_j$ of each IP core are recorded in the TG where j denotes a number of a reconfigurable resource package, and $F_j$ is initialized to 0.

After the system is initialized, the task is created. In this embodiment of the present invention, a process of creating the task is a process of separating a code segment of a smaller granularity from an original application program. A state of the task is set to a non-ready state, the task is inserted into the tail of the non-ready queue Lu, and a task processing process starts.

S202. Determine whether a task at the head of a non-ready queue Lu is ready.

It should be understood that in this embodiment of the present invention, readiness of a task refers to readiness of all input data of the task. The system includes a unique non-ready task queue, and a non-ready hardware task and a software task share the non-ready task queue.

If the task at the head of the ready queue Lu is not ready in S202, the process proceeds to S203: Wait for the task to be ready, and move the task from the head of the non-ready queue Lu to the tail of Lu.

S204. If the task is ready, set a state of the task to a ready state first, and then delete the task from the non-ready queue Lu and temporarily store the task, and finally, determine whether a type of the task is a hardware task.

In S204, if the task is a software task, the process proceeds to S205: Execute the software task on a processor (for example, a CPU).

In this embodiment of the present invention, an independent software task queue exists on each processor (for example, a CPU), and load may be migrated between software task queues. A software task queue does not distinguish a specific function of a software task, and all ready software tasks can share the software task queue. In S205, all software task queues $LR_k$ are searched, and the task temporarily stored in S204 is inserted into the shortest task queue $LR_k$, and 1 is added to a length $Length(LR_k)$ of $LR_k$. The present invention does not limit the location of the task inserted into the task queue.

S206. If the task is a hardware task, add the task into a ready queue of a corresponding function.

In this embodiment of the present invention, a hardware task of each function has an independent hardware task queue. The task in each queue may be executed according to a first-come first-served FCFS policy. A hardware task queue may provide a service for multiple reconfigurable resource packages simultaneously, thereby achieving a purpose of concurrently executing hardware task.

In S206, the temporarily stored task in S204 is inserted into the corresponding hardware task queue $L_i$, and 1 is added to the length $Length(L_i)$ of $L_i$.

S207. Compute to determine whether reconfiguration is required.

S208. Perform resource reconfiguration when the reconfiguration is required.

S209. Perform task migration.

In this embodiment of the present invention, after the reconfiguration is completed, the state of the task at the head of the corresponding hardware task queue is set to an executing state, and the task is migrated onto the reconfigured IP core for executing.

S210. Execute the task in the ready queue according to a first-come first-served policy.

In S210, when each task starts to be executed, $F_j$ of the corresponding IP core in the global information table TG is set to a sum of task starting time and a task execution time $T_i$.

In this embodiment of the present invention, a result is returned in an interruption manner after the task execution ends. If the task is a software task, the task in the software task queue $LR_k$ is deleted, and 1 is subtracted from Length $(LR_k)$; or if the task is a hardware task, the task in the hardware task queue $L_i$ is deleted, and 1 is subtracted from $Length(L_i)$, and the anticipated execution ending time $F_j$ of the IP core corresponding to the task in the global information table TG is updated and set to current time.

The following describes in detail, with reference to FIG. 8, step S207 for computing to determine whether reconfiguration is required, and step S208 about a process and a method for performing resource reconfiguration when the reconfiguration is required.

As shown in FIG. 8, in S301, the computing platform determines a reconfigurable resource package set, an IP core function set, and a mapping relationship between the reconfigurable resource package set and the IP core function set.

In S302, a priority of a hardware task is computed.

The computing platform computes priorities of all types of hardware tasks according to a function implemented by the hardware task and whether the hardware task has been laid out. If the hardware task has been laid out, the priority $P_i$ of the task is set to $d*T_i*Length(L_i)/K_i$; if the hardware task has not yet laid out, the priority $P_i$ of the hardware task is set to $T_i*Length(L_i)$.

In S303, it is determined whether the priority of the to-be-executed hardware task is the highest in all the hardware tasks.

In S304, it is determined whether an idle reconfigurable resource package that can be used to lay out an IP core for executing the to-be-executed hardware task exists.

If no idle reconfigurable resource package exists in S304, the process proceeds to S305, and the to-be-executed hardware task enters a long sleep state, where a sleep time is a difference between minimum $F_j$ and current time.

In S306, when any idle reconfigurable resource package that can be used to lay out an IP core for executing the to-be-executed hardware task exists, an idle reconfigurable resource packages are selected as a candidate reconfigurable resource package, and the to-be-executed task enters a short sleep state, where a sleep time is a short sleep time threshold that is set when the computing platform is initialized.

In S307, after the to-be-executed hardware task enters the short sleep state for M times, it is determined whether the priority of the to-be-executed hardware task is still the highest in all the hardware tasks.

In S308, when the priority of the to-be-executed hardware task is the highest, resource reconfiguration is performed, and the candidate reconfigurable resource package is reconfigured into the IP core for executing the to-be-executed hardware task.

In S309, type (Type) information of an IP core corresponding to a corresponding reconfigurable resource package in a global information table TG is updated, and a state of a task at the head of a hardware task queue corresponding to the function of the to-be-executed hardware task is set to a reconfiguring state; $K_i$ of the to-be-executed hardware task is updated, 1 is added to and according to a formula $d*T_i*Length(L_i)/K_i$, a priority $P_i$ of another hardware task with the same function as the to-be-executed hardware task in the system is re-computed.

Therefore, in the task scheduling method in this embodiment of the present invention, when determining that a to-be-executed hardware task is in a ready state, the to-be-executed hardware task is added into a target hardware task queue corresponding to a function of the to-be-executed hardware task; according to a priority of the to-be-executed hardware task and a usage status of the multiple reconfigurable resource packages, at least one reconfigurable resource package in the multiple reconfigurable resource packages is reconfigured into a target IP core that can execute the to-be-executed hardware task; and the hardware task in the target hardware task queue is executed by using the target IP core. According to the priority of the to-be-executed hardware task and the usage status of the multiple reconfigurable resource packages, a computing platform can determine a more proper resource reconfiguration occasion and use a more appropriate reconfigurable resource package for resource reconfiguration. In addition, a reconfigurable resource package that is executing a task is not interfered in a reconfiguration process, thereby enhancing system concurrency and reducing reconfiguration overheads in a task scheduling process. In addition, the computing platform establishes a mapping relationship between the reconfigurable resource package and the function, which can reduce design space exploration required when the system performs task scheduling and resource management, and therefore reduce scheduling overheads and resource management overheads. Still further, the computing platform creates a separate task queue for hardware tasks of each function, and uses an FCFS service manner, which can further reduce scheduling overheads of the hardware tasks and enhance utilization of reconfigurable resources.

Figure 9:
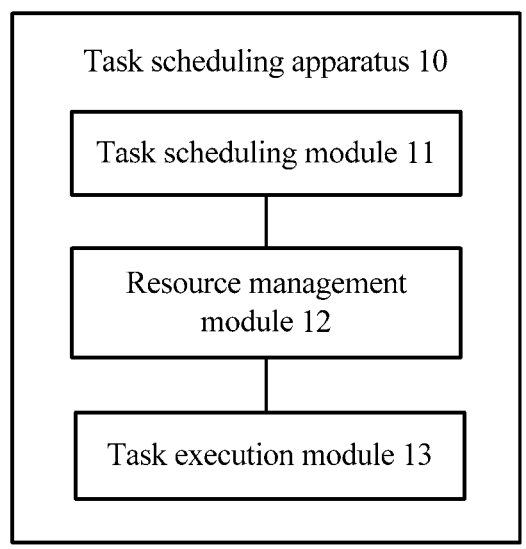
FIG. 9 is a schematic block diagram of a task scheduling apparatus on a heterogeneous multi-core reconfigurable computing platform according to an embodiment of the present invention.

FIG. 9 is a schematic block diagram of a task scheduling apparatus on a heterogeneous multi-core reconfigurable computing platform according to an embodiment of the present invention. The heterogeneous multi-core reconfigurable computing platform includes multiple reconfigurable resource packages. As shown in FIG. 9, the task scheduling apparatus 10 includes:

a task scheduling module 11, configured to: when determining that a to-be-executed hardware task is in a ready state, add the to-be-executed hardware task into a target hardware task queue corresponding to a function of the to-be-executed hardware task;

a resource management module 12, configured to reconfigure, according to a priority of the to-be-executed hardware task and a usage status of the multiple reconfigurable resource packages, at least one reconfigurable resource package in the multiple reconfigurable resource packages into a target intellectual property IP core that can execute the to-be-executed hardware task; and a task execution module 13, configured to execute the hardware task in the target hardware task queue by using the target IP core that is reconfigured by the resource management module.

Specifically, when determining that the to-be-executed hardware task is in the ready state, the computing platform adds the to-be-executed hardware task into the target hardware task queue corresponding to the function of the to-be-executed hardware task; reconfigures, according to the priority of the to-be-executed hardware task and the usage status of the multiple reconfigurable resource packages, at least one reconfigurable resource package in the multiple reconfigurable resource packages into the target IP core that can execute the to-be-executed hardware task; and after completing reconfiguration, executes the hardware task in the target hardware task queue by using the target IP core.

Therefore, when determining that a to-be-executed hardware task is in a ready state, the task scheduling apparatus in this embodiment of the present invention adds the to-be-executed hardware task into a target hardware task queue corresponding to a function of the to-be-executed hardware task; reconfigures, according to a priority of the to-be-executed hardware task and a usage status of the multiple reconfigurable resource packages, at least one reconfigurable resource package in the multiple reconfigurable resource packages into a target IP core that can execute the to-be-executed hardware task; and executes the hardware task in the target hardware task queue by using the target IP core. According to the priority of the to-be-executed hardware task and the usage status of the multiple reconfigurable resource packages, the task scheduling apparatus can determine a more proper resource reconfiguration occasion and use a more appropriate reconfigurable resource package for resource reconfiguration, thereby enhancing system concurrency, reducing reconfiguration overheads and improving utilization of reconfigurable resources in the task scheduling process.

In this embodiment of the present invention, optionally, in terms of the reconfiguring, according to a priority of the to-be-executed hardware task and a usage status of the multiple reconfigurable resource packages, at least one reconfigurable resource package in the multiple reconfigurable resource packages into a target intellectual property IP core that can execute the to-be-executed hardware task, the resource management module 12 is specifically configured to: determine existence of idle reconfigurable resource packages according to the usage status of the multiple reconfigurable resource packages when the priority of the to-be-executed hardware task is a target priority, where the idle reconfigurable resource packages are used to lay out the target IP core, a hardware task corresponding to the target priority belongs to a first hardware task set, and a priority of each hardware task in the first hardware task set is higher than a priority of each hardware task in a second hardware task set; and reconfigure at least one idle reconfigurable resource package in the idle reconfigurable resource packages into the target IP core that can execute the to-be-executed hardware task.

In this embodiment of the present invention, optionally, the resource management module 12 is specifically configured to: determine the priority of the to-be-executed hardware task according to a length of the target hardware task queue and a quantity of IP cores that can execute the to-be-executed hardware task.

In this embodiment of the present invention, optionally, in terms of the reconfiguring at least one idle reconfigurable resource package in the idle reconfigurable resource packages into the target IP core that can execute the to-be-executed hardware task, the resource management module 12 is specifically configured to: determine a target reconfigurable resource package, where the target reconfigurable resource package is any reconfigurable resource package in the idle reconfigurable resource packages; and reconfigure the target reconfigurable resource package into the target IP core.

In this embodiment of the present invention, optionally, the resource management module 12 is further configured to: re-determine the priority of the to-be-executed hardware task if a quantity of times for which the to-be-executed hardware task changes from the ready state into a short sleep state reaches a preset threshold.

Accordingly, in terms of the reconfiguring the target reconfigurable resource package into the target IP core, the resource management module 12 is specifically configured to: reconfigure the target reconfigurable resource package into the target IP core when the re-determined priority of the to-be-executed hardware task is the target priority.

In this embodiment of the present invention, optionally, in terms of the reconfiguring the target reconfigurable resource package into the target IP core, the resource management module 12 is specifically configured to: reconfigure the target reconfigurable resource package into the target IP core according to a target configuration file in a configuration file set, where the target configuration file carries a correspondence between the target reconfigurable resource package in the multiple reconfigurable resource packages and the target IP core.

In this embodiment of the present invention, optionally, in terms of the executing the hardware task in the target hardware task queue by using the target IP core, the task execution module is specifically configured to: execute the hardware task in the target hardware task queue according to a first-come first-served policy by using the target IP core that is reconfigured by the resource management module.

It should be understood that the foregoing and other operations and/or functions of the task scheduling apparatus 10 according to this embodiment of the present invention are intended to implement a method in FIG. 1, FIG. 2, FIG. 4, and FIG. 5 respectively, and for brevity, no details are given herein any further.

Therefore, when determining that a to-be-executed hardware task is in a ready state, the task scheduling apparatus in this embodiment of the present invention adds the to-be-executed hardware task into a target hardware task queue corresponding to a function of the to-be-executed hardware task; reconfigures, according to a priority of the to-be-executed hardware task and a usage status of the multiple reconfigurable resource packages, at least one reconfigurable resource package in the multiple reconfigurable resource packages into a target IP core that can execute the to-be-executed hardware task; and executes the hardware task in the target hardware task queue by using the target IP core. According to the priority of the to-be-executed hardware task and the usage status of the reconfigurable resource packages, the task scheduling apparatus can determine a more proper resource reconfiguration occasion and use a more appropriate reconfigurable resource package for resource reconfiguration. In addition, a reconfigurable resource package that is executing a task is not interfered in a reconfiguration process, thereby enhancing system concurrency, reducing reconfiguration overheads and improving utilization of reconfigurable resources in a task scheduling process.

Figure 10:
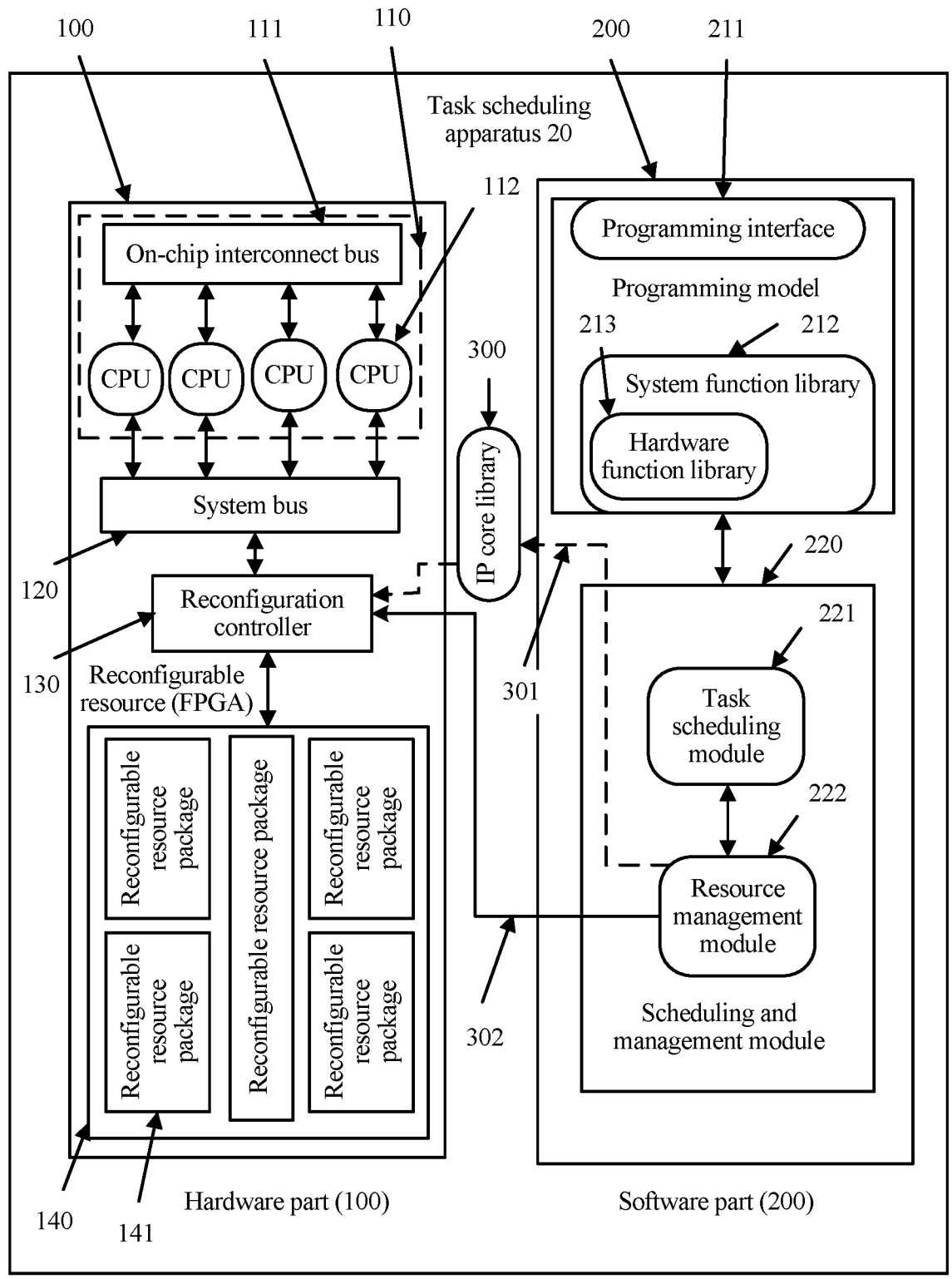
FIG. 10 shows a schematic block diagram of a task scheduling apparatus on a heterogeneous multi-core reconfigurable computing platform according to another embodiment of the present invention.

FIG. 10 shows a schematic block diagram of a task scheduling apparatus 20 on a heterogeneous multi-core reconfigurable computing platform according to another embodiment of the present invention.

As shown in FIG. 10, a structure of the task scheduling apparatus 20 on the heterogeneous multi-core reconfigurable computing platform is divided into two main parts: a hardware part (100) and a software part (200).

The hardware part (100) includes parts such as an on-chip multi-core system (110), a system bus (120), a reconfiguration controller (130), and a reconfigurable resource (FPGA) (140). The on-chip multi-core system (110) is a carrier for executing a software task, and includes an on-chip interconnect bus (111) and a multi-core CPU (112). The system bus is connected to the multi-core system and peripheral devices, such as a memory and a hard disk. A device closely related to the reconfigurable platform is the reconfiguration controller (130). The reconfiguration controller receives a reconfiguration control signal (301) and a reconfiguration data signal (302), and performs a reconfiguration operation on the reconfigurable resource. The reconfigurable resource is divided into different reconfigurable resource packages (141), and each reconfigurable resource package may be used as an independent device.

The software part (200) includes two parts: a programming model (210) and a scheduling and resource management module (220). The programming model provides a programming interface (211) for a user, and creates a task by means of a system function library (212). A hardware function library (213) in the system function library is specific to the reconfigurable platform, and the hardware function library (213) defines an interface for invoking the reconfigurable resource package on the reconfigurable resource. The scheduling and resource management module includes two sub-parts: a task scheduling module (221) and a resource management module (222). The task scheduling module (221) decides a task execution occasion and a task execution unit. The resource management module (222) manages the reconfigurable resource according to a task scheduling result by using the reconfiguration control signal (302) and the reconfiguration data signal (301). The reconfiguration control signal (301) is a trigger signal for controlling a status and process of reconfiguration, and the reconfiguration data signal (302) is a specific function that needs to be configured to guide the reconfigurable resource.

Configuration information of an IP core that can be laid out on each reconfigurable resource package in the reconfigurable resource is stored in an IP core library (300), and a representation form of the configuration information of the IP core is a netlist, a gate circuit, or the like. According to the received reconfiguration data signal (302), the IP core library (300) provides the reconfiguration controller (130) with configuration information required for laying out the IP core.

The task scheduling module (221) is configured to: when determining that a to-be-executed hardware task is in a ready state, add the to-be-executed hardware task into a target hardware task queue corresponding to a function of the to-be-executed hardware task.

The resource management module (222) is configured to reconfigure, according to a priority of the to-be-executed hardware task and a usage status of the multiple reconfigurable resource packages (141), at least one reconfigurable resource package in the multiple reconfigurable resource packages into a target intellectual property IP core that can execute the to-be-executed hardware task.

A reconfigurable resource package that performs resource reconfiguration in the reconfigurable resource packages (141) is configured to execute the hardware task in the target hardware task queue by using the reconfigured target IP core.

Optionally, in an embodiment, in terms of the reconfiguring, according to a priority of the to-be-executed hardware task and a usage status of the multiple reconfigurable resource packages (141), at least one reconfigurable resource package in the multiple reconfigurable resource packages (141) into a target intellectual property IP core that can execute the to-be-executed hardware task, the resource management module (222) is specifically configured to: determine existence of idle reconfigurable resource packages according to the usage status of the multiple reconfigurable resource packages when the priority of the to-be-executed hardware task is a target priority, where the idle reconfigurable resource packages are used to lay out the target IP core, a hardware task corresponding to the target priority belongs to a first hardware task set, and a priority of each hardware task in the first hardware task set is higher than a priority of each hardware task in a second hardware task set; and reconfigure at least one idle reconfigurable resource package in the idle reconfigurable resource packages in the multiple reconfigurable resource packages (141) into the target IP core that can execute the to-be-executed hardware task.

Optionally, in another embodiment, the resource management module (222) is further configured to: determine the priority of the to-be-executed hardware task according to a length of the target hardware task queue and a quantity of IP cores that can execute the to-be-executed hardware task.

Optionally, in another embodiment, in terms of the reconfiguring at least one reconfigurable resource package in the idle reconfigurable resource packages in the multiple reconfigurable resource packages (141) into the target IP core that can execute the to-be-executed hardware task, the resource management module (222) is specifically configured to: determine a target reconfigurable resource package, where the target reconfigurable resource package is any reconfigurable resource package in the idle reconfigurable resource packages; and reconfigure the target reconfigurable resource package into the target IP core.

Optionally, in another embodiment, the resource management module (222) is further configured to: re-determine the priority of the to-be-executed hardware task if a quantity of times for which the to-be-executed hardware task changes from the ready state into a short sleep state reaches a preset threshold.

Accordingly, in terms of the reconfiguring the target reconfigurable resource package into the target IP core, the resource management module (222) is specifically configured to: reconfigure the target reconfigurable resource package into the target IP core when the re-determined priority of the to-be-executed hardware task is the target priority.

Optionally, in another embodiment, in terms of the reconfiguring the target reconfigurable resource package into the target IP core, the resource management module (222) is specifically configured to: reconfigure the target reconfigurable resource package into the target IP core according to a target configuration file in a configuration file set, where the target configuration file carries a correspondence between the target reconfigurable resource package in the multiple reconfigurable resource packages and the target IP core.

Optionally, in another embodiment, in terms of the executing the hardware task in the target hardware task queue by using the target IP core, the reconfigurable resource package for performing resource reconfiguration in the reconfigurable resource packages (141) is specifically configured to: execute the hardware task in the target hardware task queue according to a first-come first-served policy by using the reconfigured target IP core.

Therefore, when determining that a to-be-executed hardware task is in a ready state, the task scheduling apparatus in this embodiment of the present invention adds the to-be-executed hardware task into a target hardware task queue corresponding to a function of the to-be-executed hardware task; reconfigures, according to a priority of the to-be-executed hardware task and a usage status of the multiple reconfigurable resource packages, at least one reconfigurable resource package in the multiple reconfigurable resource packages into a target IP core that can execute the to-be-executed hardware task; and executes the hardware task in the target hardware task queue by using the target IP core. According to the priority of the to-be-executed hardware task and the usage status of the multiple reconfigurable resource packages, the task scheduling apparatus can determine a more proper resource reconfiguration occasion and use a more appropriate reconfigurable resource package for resource reconfiguration. In addition, a reconfigurable resource package that is executing a task is not interfered in a reconfiguration process, thereby enhancing system concurrency, reducing reconfiguration overheads and improving utilization of reconfigurable resources in a task scheduling process.

Figure 11:
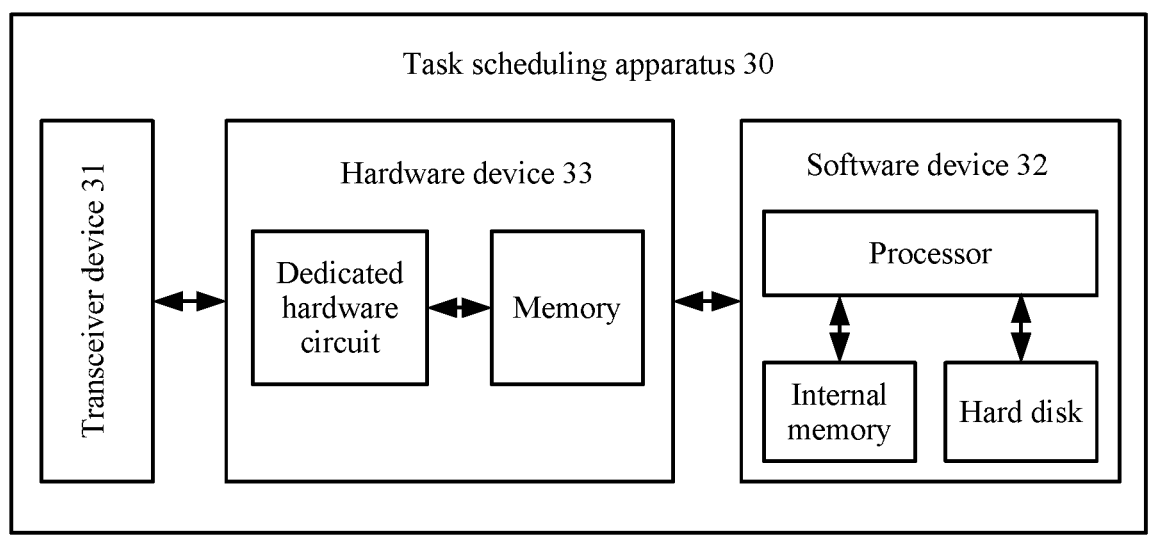
FIG. 11 shows a schematic block diagram of a task scheduling apparatus on a heterogeneous multi-core reconfigurable computing platform according to still another embodiment of the present invention.

FIG. 11 shows a schematic block diagram of a task scheduling apparatus 30 on a heterogeneous multi-core reconfigurable computing platform according to still another embodiment of the present invention.

As shown in FIG. 11, a hardware structure of the task scheduling apparatus 30 on the heterogeneous multi-core reconfigurable computing platform may include three parts: a transceiver device 31, a software device 32, and a hardware device 33.

The transceiver device 31 is a hardware circuit for completing packet sending and receiving.

The hardware device 33 may also be referred to as a "hardware processing module", or more briefly referred to as "hardware". The hardware device 33 mainly includes hardware circuits that implement some specific functions based on a dedicated hardware circuit such as an FPGA or an ASIC (or together with another auxiliary device such as a memory). A processing speed of the hardware device is much higher than that of a general purpose processor, but a function of the hardware device can be hardly changed once customized. Therefore, implementation is not flexible, and the hardware device is generally used to process fixed functions. It should be noted that in actual application, the hardware device 33 may further include a processor such as an MCU (a microprocessor such as a single-chip microcomputer) or a CPU. However, a main function of the processor is not to process big data, but is mainly used for control. In this application scenario, a system built of these devices is a hardware device.

The software device 32 (or briefly referred to as "software") mainly includes a general purpose processor (such as a CPU) and some auxiliary devices (for example, storage devices such as a memory and a hard disk). Programming may enable the processor to have a corresponding processing function. In implementation using software, configuration may be flexible according to a service requirement, but a speed is generally lower than that of a hardware device. After the software completes processing, the hardware device 33 may send processed data by using the transceiver device 31, or the processed data may be sent to the transceiver device 31 by using an interface connected to the transceiver device 31.

Optionally, in an embodiment, the software device 32 is configured to: when determining that a to-be-executed hardware task is in a ready state, add the to-be-executed hardware task into a target hardware task queue corresponding to a function of the to-be-executed hardware task; and reconfigure, according to a priority of the to-be-executed hardware task and a usage status of multiple reconfigurable resource packages included in the hardware device 33, at least one reconfigurable resource package in the multiple reconfigurable resource packages into a target intellectual property IP core that can execute the to-be-executed hardware task; and the hardware device 33 is configured to execute the hardware task in the target hardware task queue according to the target IP core that is reconfigured by the software device 32.

Optionally, in another embodiment, in terms of the reconfiguring, according to a priority of the to-be-executed hardware task and a usage status of the multiple reconfigurable resource packages, at least one reconfigurable resource package in the multiple reconfigurable resource packages into a target intellectual property IP core that can execute the to-be-executed hardware task, the software device 32 is specifically configured to: determine existence of idle reconfigurable resource packages according to the usage status of the multiple reconfigurable resource packages when the priority of the to-be-executed hardware task is a target priority, where the idle reconfigurable resource packages are used to lay out the target IP core, a hardware task corresponding to the target priority belongs to a first hardware task set, and a priority of each hardware task in the first hardware task set is higher than a priority of each hardware task in a second hardware task set; and reconfigure at least one idle reconfigurable resource package in the idle reconfigurable resource packages into the target IP core that can execute the to-be-executed hardware task.

Optionally, in another embodiment, the software device 32 is further configured to: determine the priority of the to-be-executed hardware task according to a length of the target hardware task queue and a quantity of IP cores that can execute the to-be-executed hardware task.

Optionally, in another embodiment, in terms of the reconfiguring at least one reconfigurable resource package in the idle reconfigurable resource packages into the target IP core that can execute the to-be-executed hardware task, the software device 32 is specifically configured to: determine a target reconfigurable resource package, where the target reconfigurable resource package is any reconfigurable resource package in the idle reconfigurable resource packages; and reconfigure the target reconfigurable resource package into the target IP core.

Optionally, in another embodiment, the software device 32 is further configured to: re-determine the priority of the to-be-executed hardware task if a quantity of times for which the to-be-executed hardware task changes from the ready state into a short sleep state reaches a preset threshold; and reconfigure the target reconfigurable resource package into the target IP core when the re-determined priority of the to-be-executed hardware task is the target priority.

Optionally, in another embodiment, in terms of the reconfiguring the target reconfigurable resource package into the target IP core, the software device 32 is specifically configured to: reconfigure the target reconfigurable resource package into the target IP core according to a target configuration file in a configuration file set, where the target configuration file carries a correspondence between the target reconfigurable resource package in the multiple reconfigurable resource packages and the target IP core.

Optionally, in another embodiment, in terms of the executing the hardware task in the target hardware task queue by using the target IP core, the hardware device 33 is specifically configured to: execute the hardware task in the target hardware task queue according to a first-come first-served policy by using the reconfigured target IP core.

By means of a method that combines software and hardware in this embodiment, a more proper resource reconfiguration occasion can be determined, and a more appropriate reconfigurable resource package can be used for resource reconfiguration. In addition, a reconfigurable resource package that is executing a task is not interfered in a reconfiguration process, thereby enhancing system concurrency, reducing reconfiguration overheads and improving utilization of reconfigurable resources in a task scheduling process.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logic function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device, and may specifically be a processor in a computer device) to perform all or a part of the steps of the foregoing methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A task scheduling method in a heterogeneous multi-core reconfigurable computing platform, wherein the heterogeneous multi-core reconfigurable computing platform comprises one or more reconfigurable resource packages, wherein one or more functions of the one or more reconfigurable resource packages are dynamically variable, the one or more reconfigurable resource packages are implemented through one or more intellectual property (IP) cores, and the method comprises:
   when determining that a to-be-executed hardware task is in a ready state, adding the to-be-executed hardware task into a target hardware task queue corresponding to a function of the to-be-executed hardware task;
   determining the priority of the to-be-executed hardware task according to a length of the target hardware task queue and a quantity of IP cores that can execute the to-be-executed hardware task;
   reconfiguring, according to a priority of the to-be-executed hardware task and a usage status of the one or more reconfigurable resource packages, at least one reconfigurable resource package in the one or more reconfigurable resource packages into a target IP core that can execute the to-be-executed hardware task, wherein the priority denotes an execution order of the hardware task; and executing the hardware task in the target hardware task queue using the target IP core.

2. The method according to claim 1, wherein the reconfiguring, according to a priority of the to-be-executed hardware task and a usage status of the one or more reconfigurable resource packages, at least one reconfigurable resource package in the one or more reconfigurable resource packages into a target IP core that can execute the to-be-executed hardware task comprises:

determining existence of idle reconfigurable resource packages according to the usage status of the one or more reconfigurable resource packages when the priority of the to-be-executed hardware task is a target priority, wherein the idle reconfigurable resource packages are used to lay out the target IP core, a hardware task corresponding to the target priority belongs to a first hardware task set, and a priority of each hardware task in the first hardware task set is higher than a priority of each hardware task in a second hardware task set; and reconfiguring at least one idle reconfigurable resource package in the idle reconfigurable resource packages into the target IP core that can execute the to-be-executed hardware task.

3. The method according to claim 2, wherein the reconfiguring at least one idle reconfigurable resource package in the idle reconfigurable resource packages into the target IP core that can execute the to-be-executed hardware task comprises:

determining a target reconfigurable resource package, wherein the target reconfigurable resource package is any reconfigurable resource package in the idle reconfigurable resource packages; and reconfiguring the target reconfigurable resource package into the target IP core.

4. The method according to claim 3, wherein the method further comprises:

re-determining the priority of the to-be-executed hardware task if a quantity of times for which the to-be-executed hardware task changes from the ready state into a short sleep state reaches a preset threshold; wherein the short sleep state refers to a state in which a task waits to be waked; and accordingly, the reconfiguring the target reconfigurable resource package into the target IP core comprises:

reconfiguring the target reconfigurable resource package into the target IP core when the re-determined priority of the to-be-executed hardware task is the target priority.

5. The method of claim 4, wherein a time period threshold of the short sleep state is 200 ms or less.

6. The method according to claim 3, wherein the reconfiguring the target reconfigurable resource package into the target IP core comprises:

reconfiguring the target reconfigurable resource package into the target IP core according to a target configuration file in a configuration file set, wherein the target configuration file carries a correspondence between the target reconfigurable resource package in the one or more reconfigurable resource packages and the target IP core.

7. The method according to claim 1, wherein the executing the hardware task in the target hardware task queue using the target IP core comprises:

executing the hardware task in the target hardware task queue according to a first-come first-served policy using the target IP core.

8. A task scheduling apparatus in a heterogeneous multi-core reconfigurable computing platform, wherein the heterogeneous multi-core reconfigurable computing platform comprises one or more reconfigurable resource packages, wherein one or more functions of the one or more reconfigurable resource packages are dynamically variable, the one or more reconfigurable resource packages are implemented through one or more intellectual property (IP) cores, and the apparatus comprises a transceiver device, a software device, and a hardware device, and after the software device completes processing data, the hardware device sends the processed data using the transceiver, wherein the hardware device comprises the one or more reconfigurable resource packages;

the software device is configured to:

when determining that a state of a to-be-executed hardware task is in a ready state, add the to-be-executed hardware task into a target hardware task queue corresponding to a function of the to-be-executed hardware task; and determine the priority of the to-be-executed hardware task according to a length of the target hardware task queue and a quantity of IP cores that can execute the to-be-executed hardware task; and reconfigure, according to a priority of the to-be-executed hardware task and a usage status of the one or more reconfigurable resource packages comprised in the hardware device, at least one reconfigurable resource package in the one or more reconfigurable resource packages into a target IP core that can execute the to-be-executed hardware task, wherein the priority denotes an execution order of the hardware task; and the hardware device is configured to execute the hardware task in the target hardware task queue according to the target IP core that is reconfigured by the software device.

9. The apparatus according to claim 8, wherein in terms of the reconfiguring, according to a priority of the to-be-executed hardware task and a usage status of the one or more reconfigurable resource packages, at least one reconfigurable resource package in the one or more reconfigurable resource packages into a target intellectual property IP core that can execute the to-be-executed hardware task, the software device is specifically configured to:

determine existence of idle reconfigurable resource packages according to the usage status of the one or more reconfigurable resource packages when the priority of the to-be-executed hardware task is a target priority, wherein the idle reconfigurable resource packages are used to lay out the target IP core, a hardware task corresponding to the target priority belongs to a first hardware task set, and a priority of each hardware task in the first hardware task set is higher than a priority of each hardware task in a second hardware task set; and reconfigure at least one idle reconfigurable resource package in the idle reconfigurable resource packages into the target IP core that can execute the to-be-executed hardware task.

10. The apparatus according to claim 9, wherein for the reconfiguring at least one reconfigurable resource package in the idle reconfigurable resource package into a target IP core that can execute the to-be-executed hardware task, the software device is configured to:
   determine a target reconfigurable resource package, wherein the target reconfigurable resource package is any reconfigurable resource package in the idle reconfigurable resource packages; and
   reconfigure the target reconfigurable resource package into the target IP core.

11. The apparatus according to claim 10, wherein the software device is further configured to:
   re-determine the priority of the to-be-executed hardware task if a quantity of times for which the to-be-executed hardware task changes from the ready state into a short sleep state reaches a preset threshold; wherein the short sleep state refers to a state in which a task waits to be waked; and
   accordingly, for the reconfiguring the target reconfigurable resource package into the target IP core, the software device is configured to:
   reconfigure the target reconfigurable resource package into the target IP core when the re-determined priority of the to-be-executed hardware task is the target priority.

12. The apparatus of claim 11, wherein a time period threshold of the short sleep state is 200 ms or less.

13. The apparatus according to claim 10, wherein for the reconfiguring the target reconfigurable resource package into the target IP core, the software device is configured to:
   reconfigure the target reconfigurable resource package into the target IP core according to a target configuration file in a configuration file set, wherein the target configuration file carries a correspondence between the target reconfigurable resource package in the one or more reconfigurable resource packages and the target IP core.

14. The apparatus according to claim 10, wherein for the executing the hardware task in the target hardware task queue using the target IP core, the hardware device is configured to:
   execute the hardware task in the target hardware task queue according to a first-come first-served policy using the reconfigured target IP core.

15. A computer-readable storage medium comprising instructions which, when executed by a computer, cause the computer to carry out the method of:
   when determining that a to-be-executed hardware task is in a ready state, adding the to-be-executed hardware task into a target hardware task queue corresponding to a function of the to-be-executed hardware task;
   determine the priority of the to-be-executed hardware task according to a length of the target hardware task queue and a quantity of intellectual property (IP) cores that can execute the to-be-executed hardware task; and
   reconfiguring, according to a priority of the to-be-executed hardware task and a usage status of one or more reconfigurable resource packages, at least one reconfigurable resource package in the one or more reconfigurable resource packages into a target IP core that can execute the to-be-executed hardware task, wherein the priority denotes an execution order of the hardware task; wherein one or more functions of the one or more reconfigurable resource packages are dynamically variable, the one or more reconfigurable resource packages are implemented through one or more IP cores; and
   executing the hardware task in the target hardware task queue using the target IP core.

* * * * *